US010412871B2

(12) United States Patent
Balvanz et al.

(10) Patent No.: US 10,412,871 B2
(45) Date of Patent: Sep. 17, 2019

(54) DEEP RIPPER WITH QUICK ATTACH WINGS

(71) Applicants: USM Wear Tech LLC, Eldora, IA (US); Bourgault Tillage Tools, St. Brieux (CA)

(72) Inventors: Loran Balvanz, Eldora, IA (US); Dean Bigelow, St. Brieux (CA)

(73) Assignees: USM Wear Technologies, Eldora, IA (US); Bourgault Tillage Tools, St. Brieux (CA)

(*) Notice: Subject to any disclaimer, the term of this patent is extended or adjusted under 35 U.S.C. 154(b) by 0 days.

(21) Appl. No.: 15/200,237

(22) Filed: Jul. 1, 2016

(65) Prior Publication Data
US 2017/0055427 A1 Mar. 2, 2017

Related U.S. Application Data

(63) Continuation-in-part of application No. 14/958,276, filed on Dec. 3, 2015, now abandoned.

(60) Provisional application No. 62/088,168, filed on Dec. 5, 2014.

(51) Int. Cl.
*A01B 15/02* (2006.01)
*E02F 5/32* (2006.01)

(52) U.S. Cl.
CPC .............. *A01B 15/025* (2013.01); *E02F 5/32* (2013.01)

(58) Field of Classification Search
CPC ....... A01B 35/26; A01B 35/225; A01B 35/22; A01B 15/02; A01B 15/025; A01B 15/04; A01B 13/08; A01C 7/08; A01C 7/06
See application file for complete search history.

(56) References Cited

U.S. PATENT DOCUMENTS

| | | | | | |
|---|---|---|---|---|---|
| 418,389 | A | * | 12/1889 | Stephens | A01B 35/26 172/722 |
| 641,595 | A | * | 1/1900 | Hunt | A01B 13/02 172/194 |
| 1,230,686 | A | * | 6/1917 | Dixon | A01B 35/26 172/722 |
| 1,324,902 | A | * | 12/1919 | Kelly | A01B 35/26 172/722 |
| 2,024,402 | A | * | 12/1935 | Thompson | A01B 35/225 172/722 |
| 2,337,777 | A | * | 12/1943 | Seaholm | A01B 35/26 172/722 |
| 4,245,706 | A | * | 1/1981 | Dietrich, Sr. | A01B 49/02 172/180 |
| 5,111,600 | A | * | 5/1992 | Lukavich | E02F 9/285 37/452 |
| 5,456,323 | A | * | 10/1995 | Hill | A01B 15/04 172/721 |
| 5,540,288 | A | * | 7/1996 | Dietrich, Sr. | A01B 15/04 172/166 |
| 6,357,368 | B1 | * | 3/2002 | Swab | A01B 35/26 111/152 |

(Continued)

*Primary Examiner* — Jessica H Lutz
(74) *Attorney, Agent, or Firm* — Briggs and Morgan, P.A.; Daniel A. Rosenberg

(57) ABSTRACT

A deep ripper used to penetrate and fracture the soil below the surface that includes a leading edge configured to decrease wear and reduce drag, while providing superior performance. The deep ripper is comprised of a main body, a top cap, a replaceable wing, and a bracket.

28 Claims, 15 Drawing Sheets

(56) References Cited

U.S. PATENT DOCUMENTS

| | | | |
|---|---|---|---|
| 2005/0072345 A1* | 4/2005 | Steinlage | A01B 15/025 111/152 |
| 2006/0231275 A1* | 10/2006 | Bull | A01B 35/225 172/753 |
| 2013/0146317 A1* | 6/2013 | Wendte | A01B 35/20 172/1 |

* cited by examiner

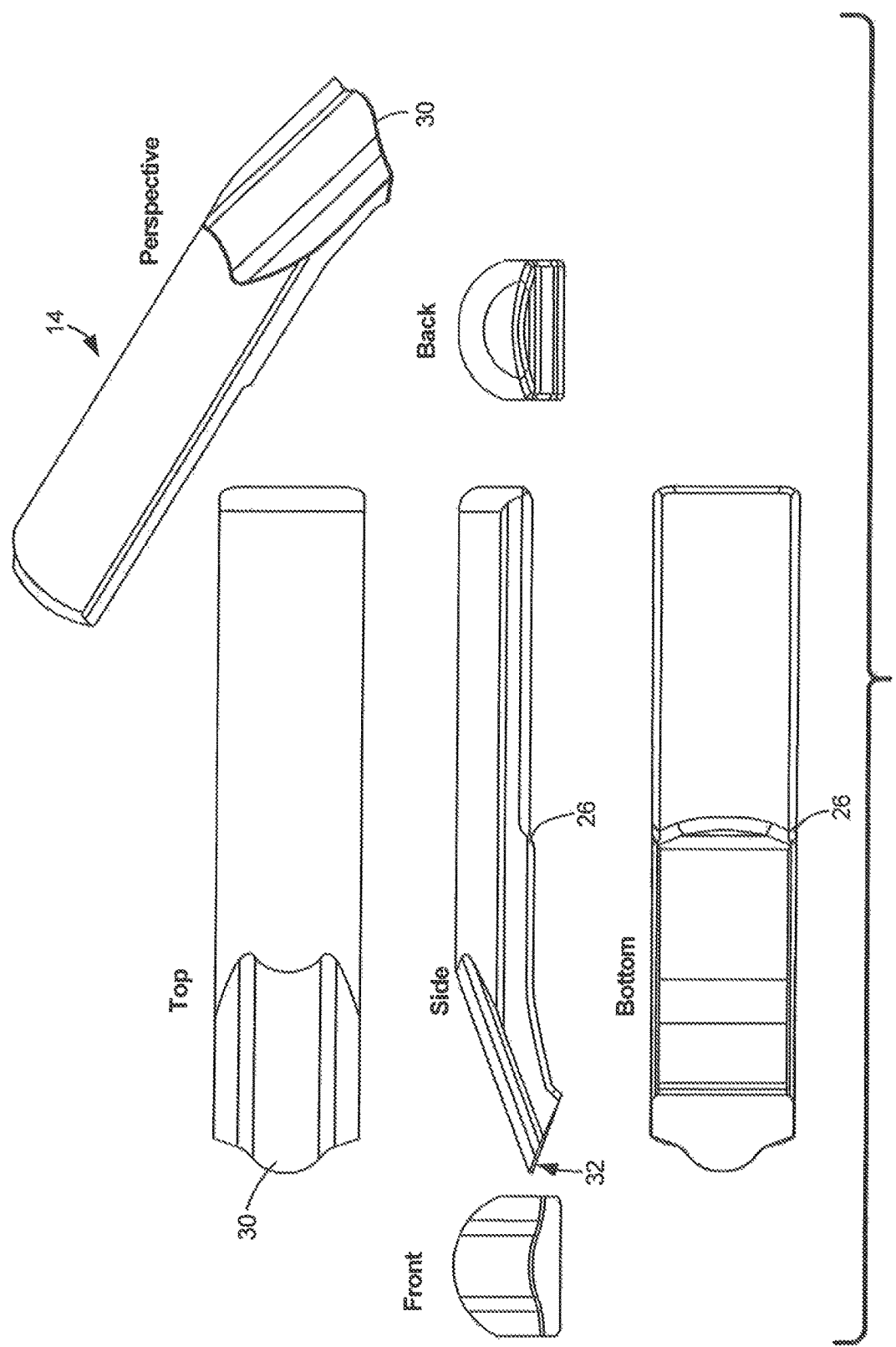

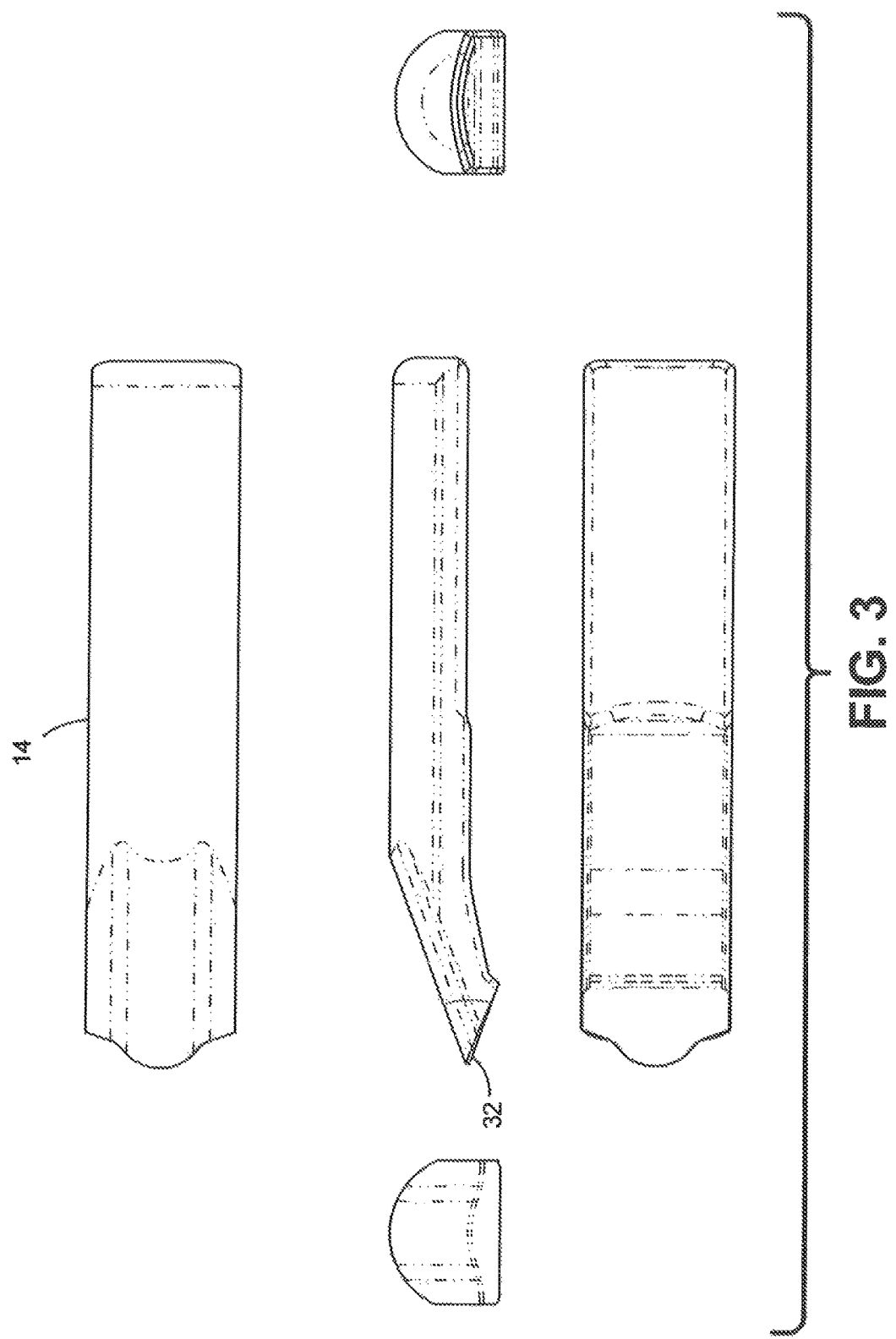

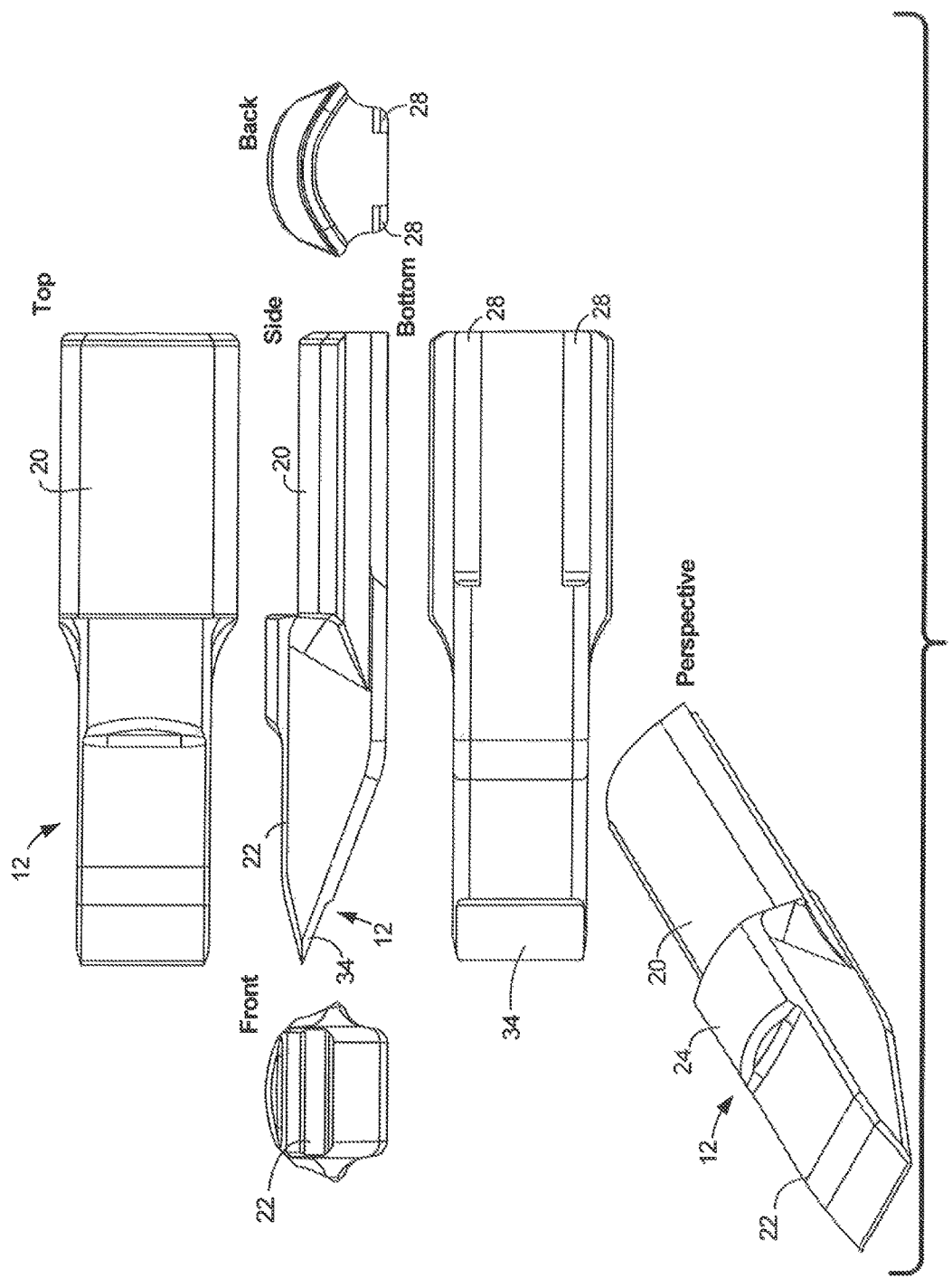

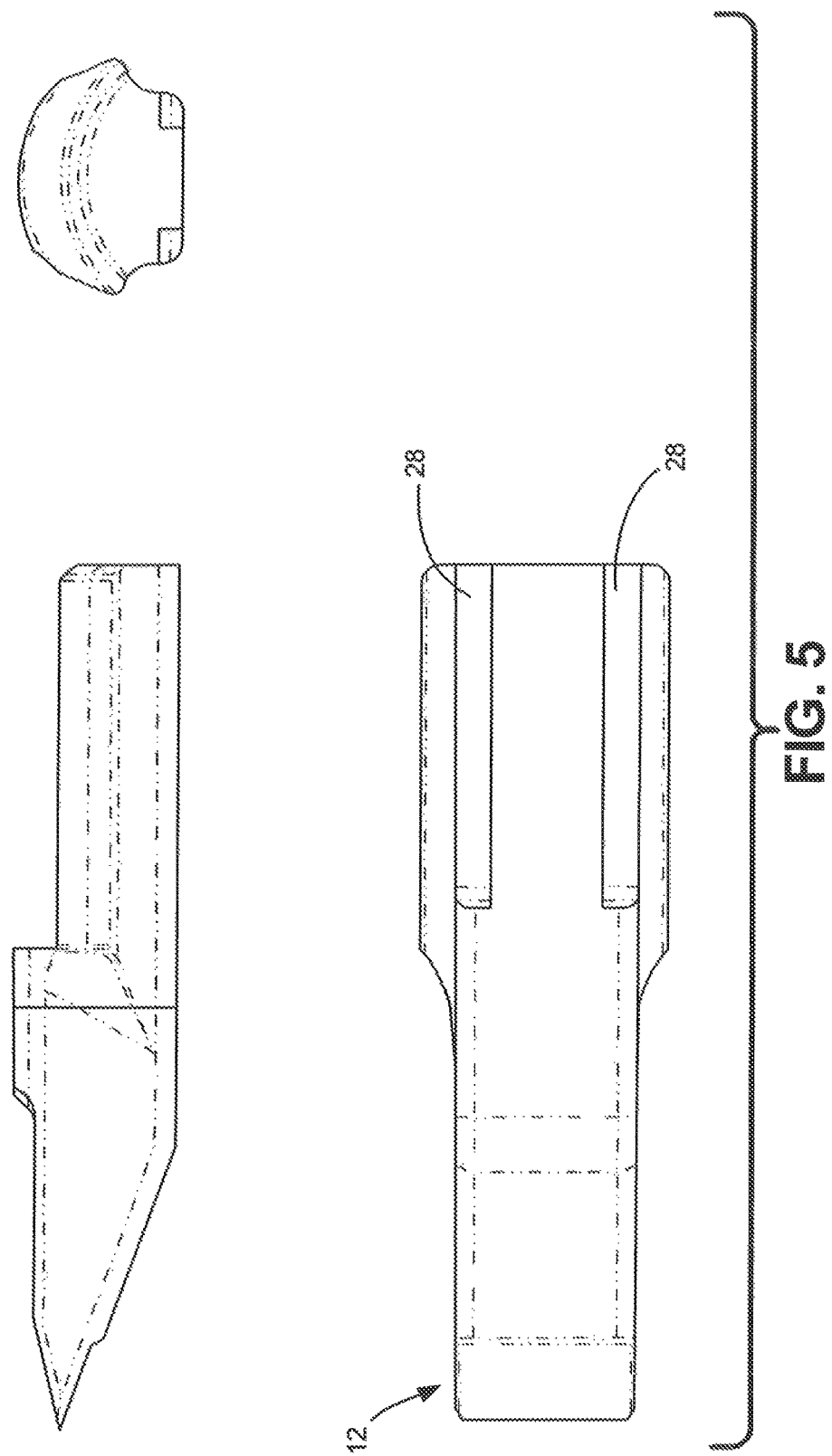

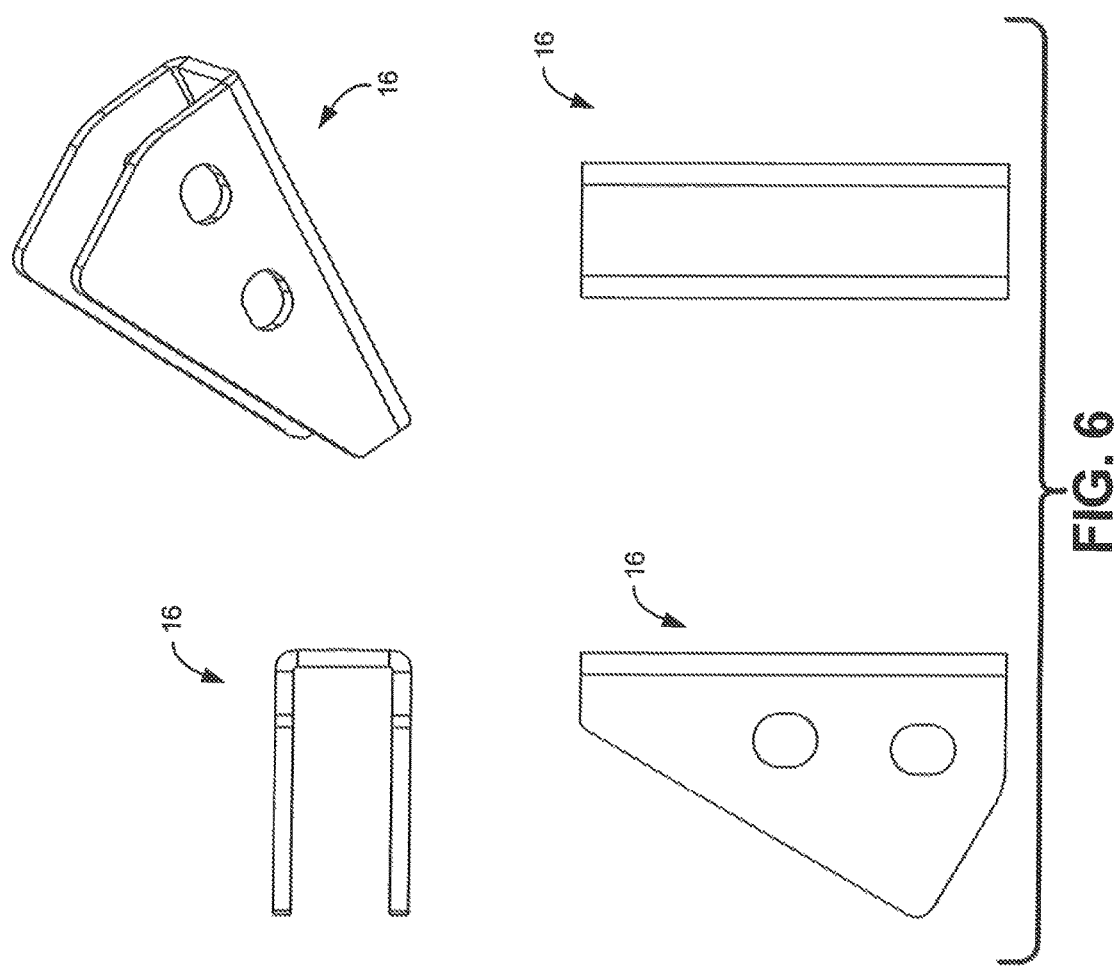

ific demands for ripping are variable, and cannot be well predicted in advance—as such things as weather conditions can cause substantial changes in a short period of

DEEP RIPPER WITH QUICK ATTACH WINGS

RELATED APPLICATION

The present application is a continuation in part to U.S. patent application Ser. No. 14/958,276 filed on Dec. 2, 2015, which claims priority to U.S. Provisional Patent Application No. 62/088,168 filed on Dec. 5, 2014, and which is the subject of PCT Application No. PCT/IB2015/002454. All of which are incorporated herein by reference hereto.

BACKGROUND OF THE INVENTION

Field

The present invention relates to a ground engagement or soil tillage tool. In particular, the invention comprises a ripper used penetrate and break up soil that includes replaceable wings to allow for easy quick adjustment to varying conditions.

Background

Deep ripping, or fracturing, of compacted soils has been a prior art practice used particularly in agricultural setting for some time. Deep ripping loosens hard compacted layers of soil by mechanically fracturing or shattering the soil hard pan.

Deep ripping has been shown to improve crop performance by giving plant roots easier access to moisture and nutrients that lie below the compact layers of soil, because the roots can grow further down into the loosened soil which they would not be able to otherwise effectively penetrate. Data has shown that ripping in general results in substantial improvements in crop yields.

Ripping is accomplish through the use of rippers, which are strong metal devices used with various types of equipment to engage with the ground for the purpose of fracturing, breaking up, and mixing the soil. Rippers are commonly used in agricultural and construction settings to engage soils for a variety of purposes. Rippers typically are attached to the end of tines that are then towed or dragged through the soil, or are used in combination with various types of equipment to prepare soils for further processing.

Rippers undergo substantial wear and tear as they impact soil, and as such are a wear part that needs periodic replacement or repair. Wear coating is commonly used to reduce the amount of wear. Typically, wear coating such as tungsten carbide is slathered on the parts in a haphazard way; with the hope that the more of the surface that is covered the longer the device will last. However, this approach suffers from a number of drawbacks.

First, wear coating dulls the cutting or ripping edges thereby interfering with the ability of the ripper to cleanly and efficiently engage the soil. Additionally, when wear coating is placed unnecessarily on the part, it is a waste of time and money, and does not end up increasing the life of the parts.

An additional factor in the effectiveness and longevity of rippers is the design and configuration of the devices. Again, prior art devices are not efficiently designed. Design features also impact the materials from which the rippers can be made, as well as the ease of manufacturing.

Further the effectiveness of ripping varies greatly based on the soil conditions, and the types of soils. For example, ripping can be very beneficial in soils with deep sandy layers, where moisture and nutrients are deeper under the surface and cannot be reached unless the soil has been fractured. Ripping conditions will vary based on how compacted the soil is, and the moisture level of the soil. Other variables include the amount of mixing of the soil that is needed. In some case it is desirable to avoid disturbing the upper level of the soil and instead break up the soil below grade. In other situations, it is desirable to fracture and mix the soil.

The precise demands for ripping are variable, and cannot be well predicted in advance—as such things as weather conditions can cause substantial changes in a short period of time. Prior art rippers are sold in advance, and do not provide flexibility to meet changing demands thereby leaving users at the mercy of a one size fits all approach that produce unsatisfactory results.

Accordingly, there is a need for an improved ripper that eliminates or substantially eliminates the drawbacks of the prior art.

BRIEF DESCRIPTION OF THE FIGURES

FIG. 2 shows a top, bottom, side, front, back, and perspective views of a top cap of the ripper.

FIG. 3 shows a top bottom, side, front, and back views of the top cap.

FIG. 4 shows a top, bottom, side, front, back, and perspective views of a main body of the ripper.

FIG. 5 shows a side, bottom, and front view of the main body of the ripper.

FIG. 6 shows side, bottom, and perspective views of a bracket of the ripper.

DETAILED DESCRIPTION OF THE INVENTION

Figure 1:
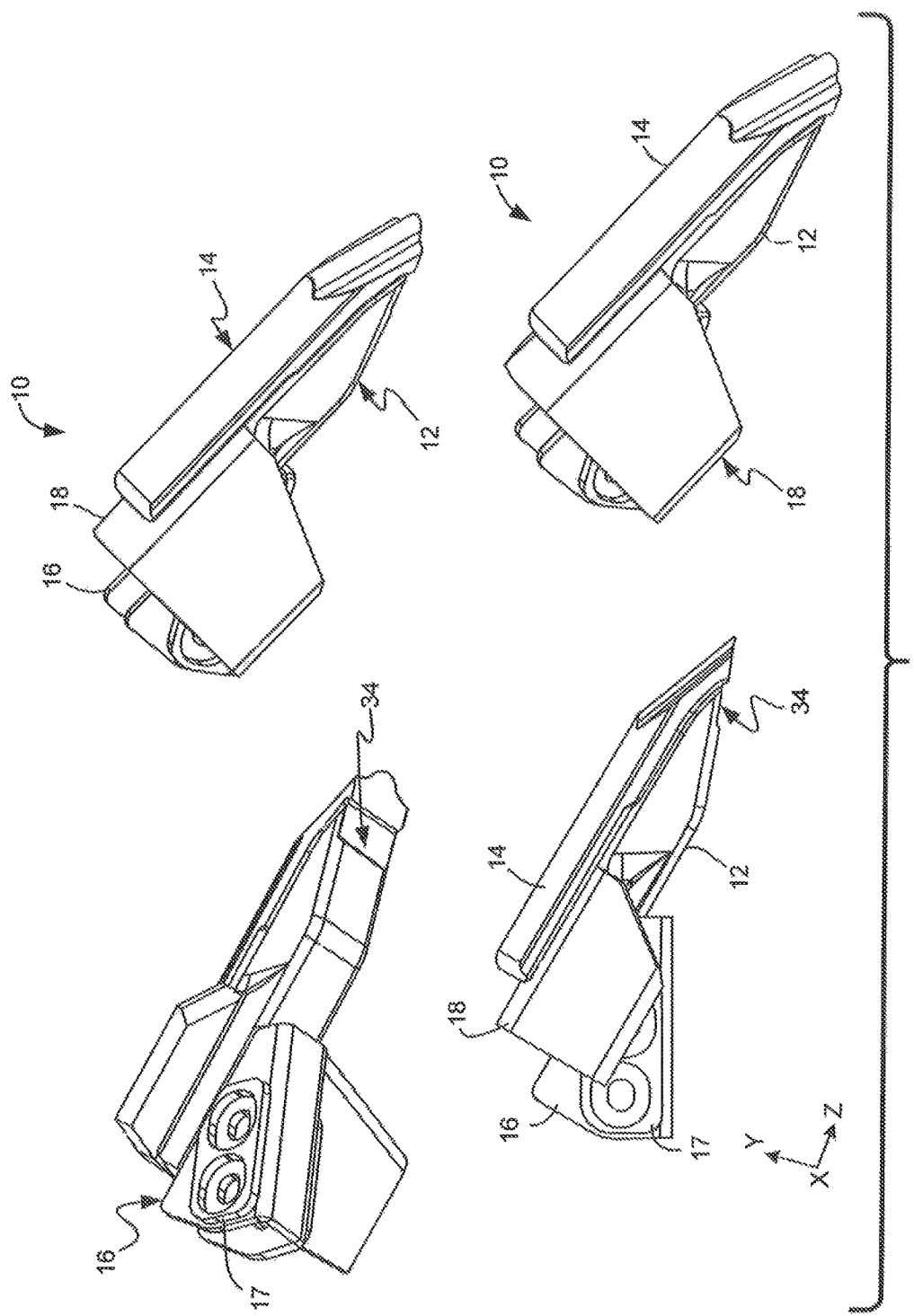
FIG. 1 shows perspective views of a ripper.
Figure 7A:
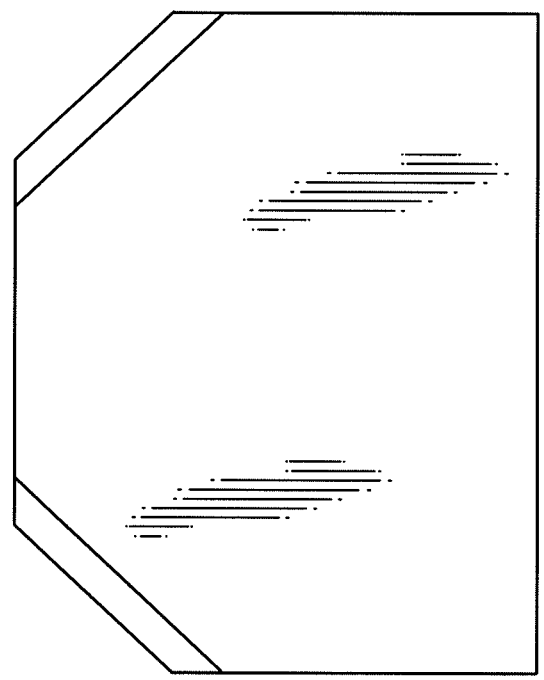
FIG. 7 shows flat and front views a wing of the ripper.
Figure 7B:
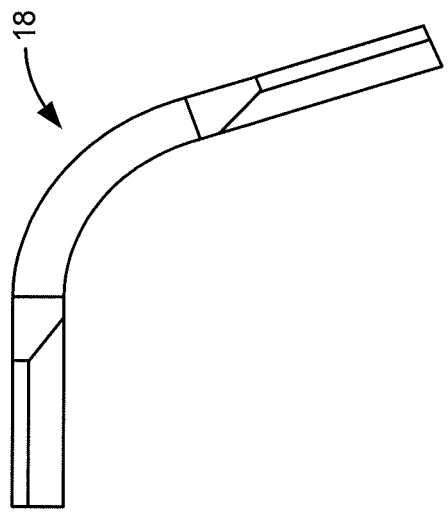
Figure 8:
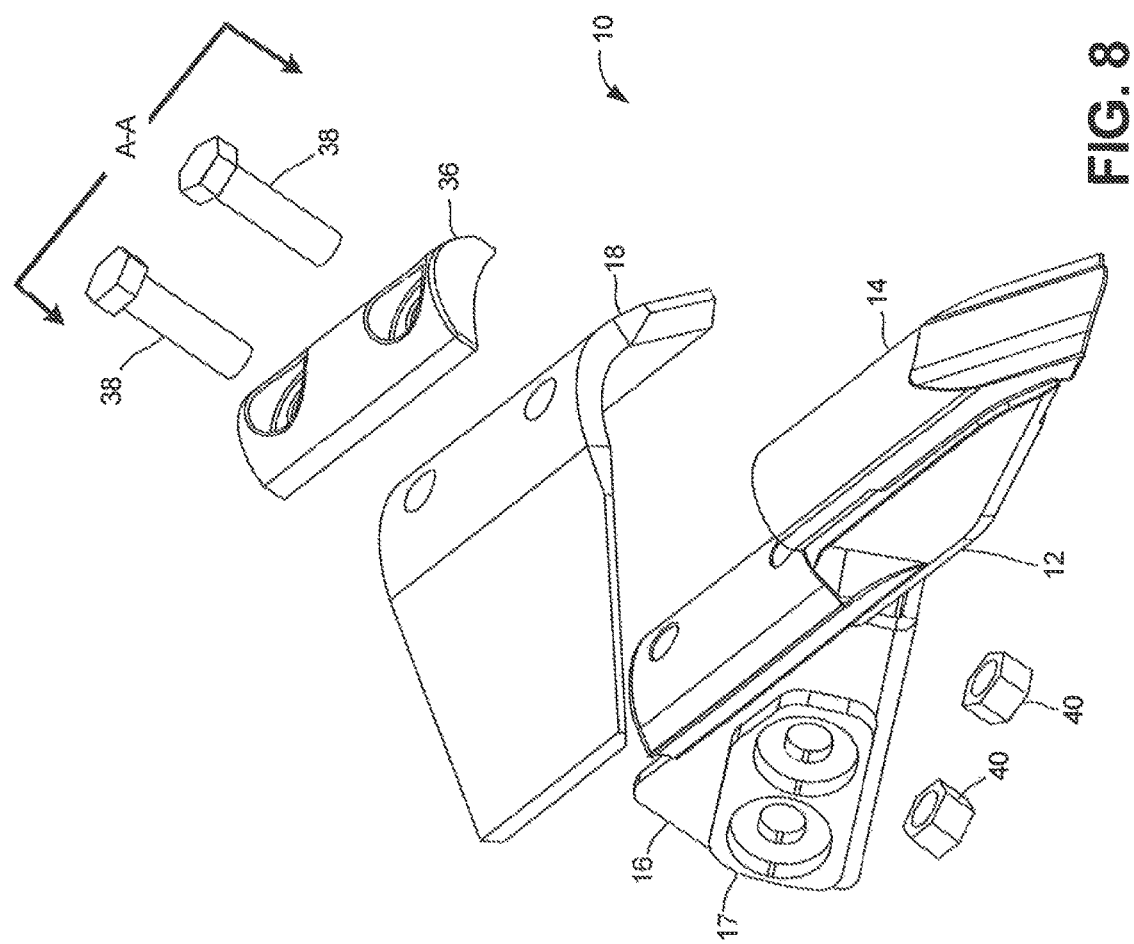
FIG. 8 shows an exploded perspective view of a ripper with replaceable wings.
Figure 9:
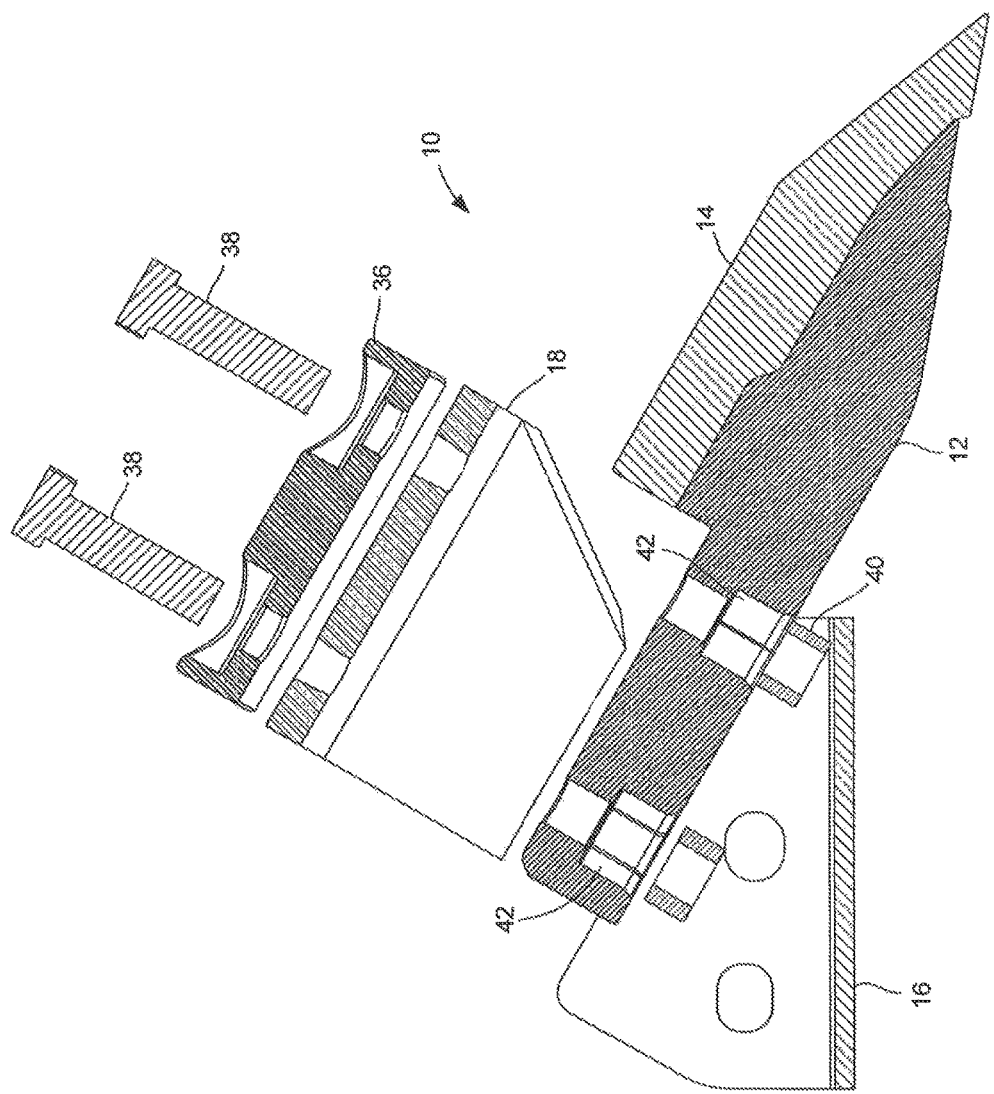
FIG. 9 shows a cross sectional view of the ripper shown in FIG. 8 taken along the line A-A.
Figure 10:
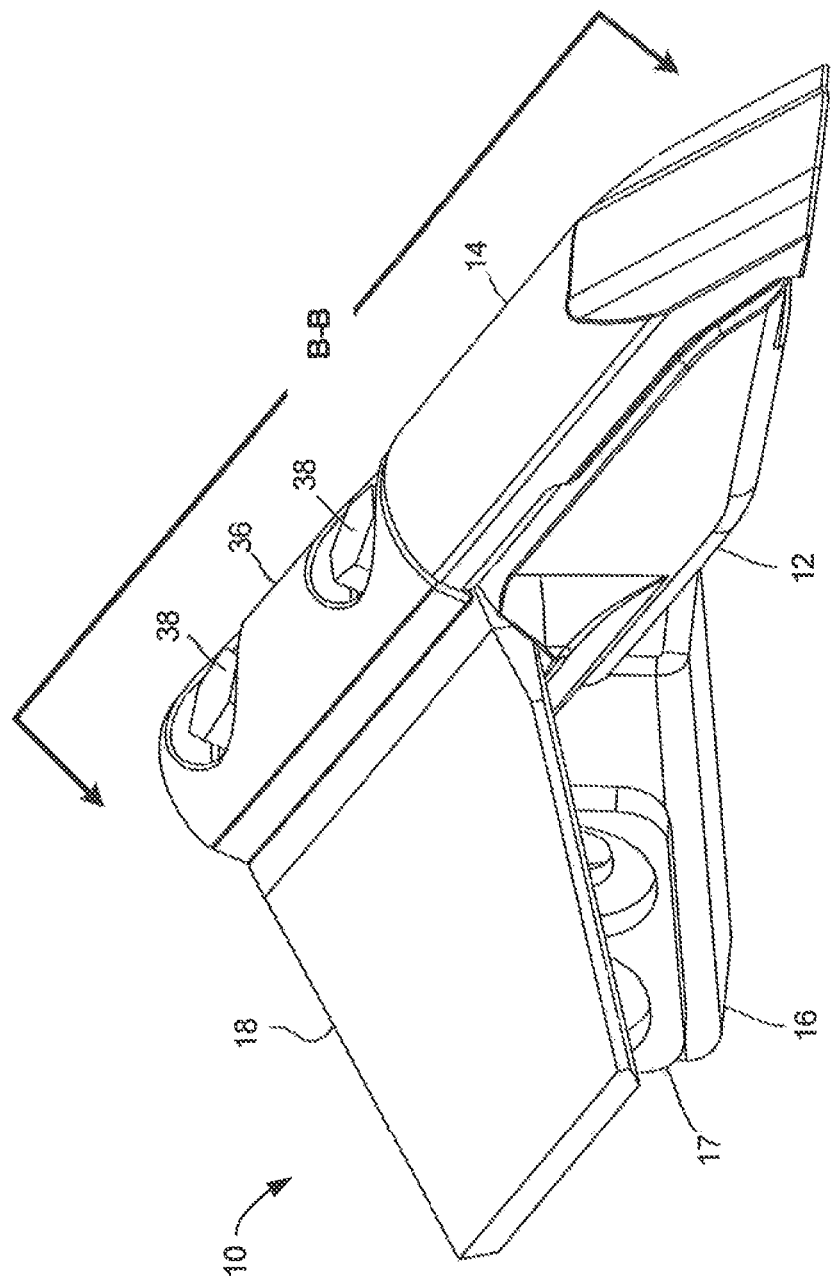
FIG. 10 shows a perspective view of the ripper.
Figure 11:
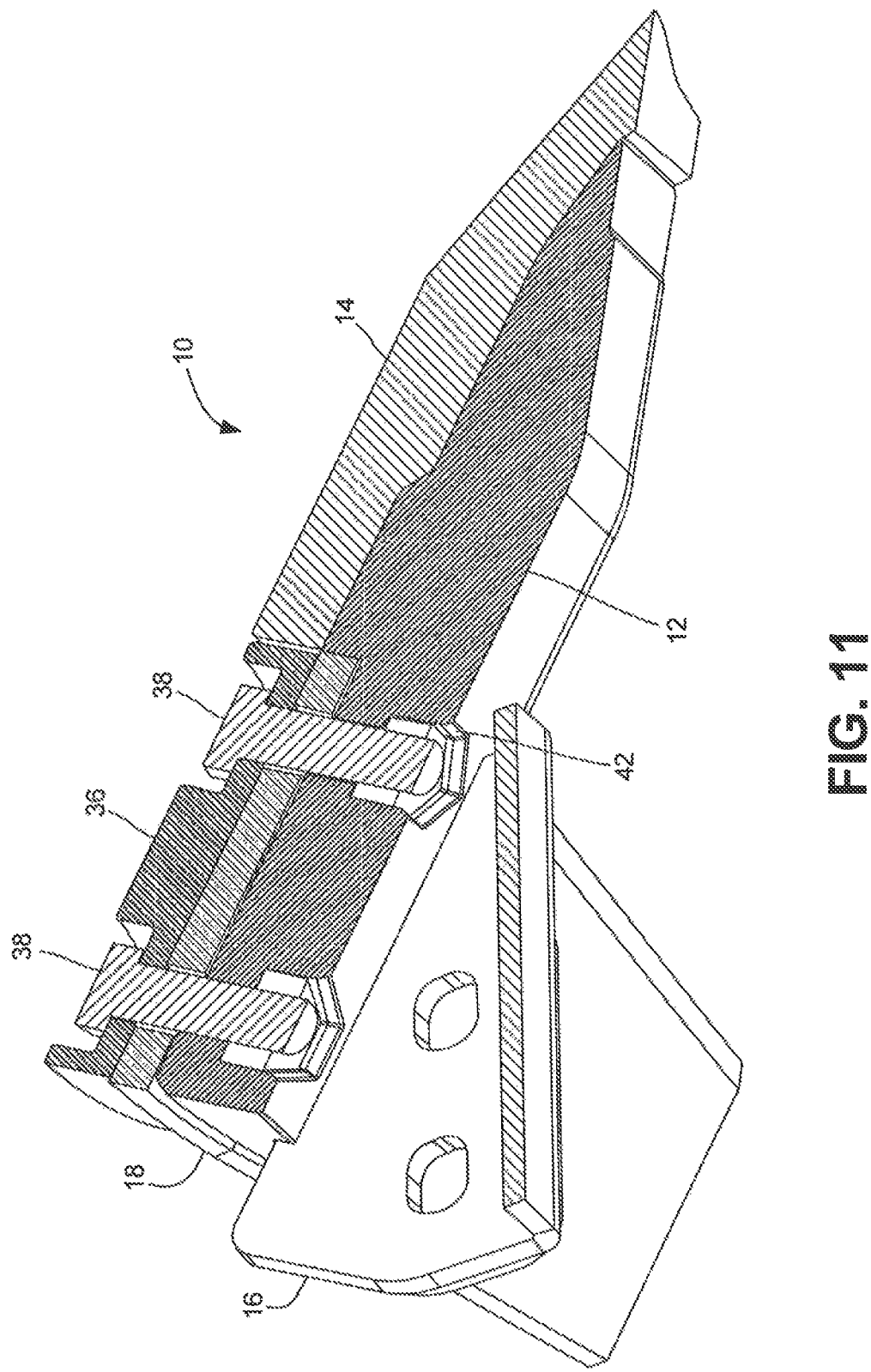
FIG. 11 shows a cross sectional view of the ripper shown in FIG. 10 taken along the line B-B.

In the Figures is shown a ripper 10, which is a device used as an attachment to agricultural, construction, and industrial machines for ground engagement purposes. The ripper 10 is comprised of the following principle components: a main body 12 (shown best in FIGS. 4-5), a top cap 14 (shown best in FIGS. 2-3), a bracket 16 (shown best in FIG. 6), and a wing 18 (shown best in FIG. 7). The parts of the ripper 10 are integrated into a single device, but perform different functions therein. Multiple views of the integrated ripper 10 are shown in FIG. 1.

The main body 12 forms the core of the ripper 10 and provides space for attaching the various other parts of the ripper 10 and includes configurations that are important to the success of the device in overcoming the problems in the prior art. In particular, the main body 12 is fabricated from heated treated alloy, or similar materials. The main body 12 includes a curved rear portion 20 for receipt of the wing 18. The curvature of the rear portion 20 allows the wings 18 to have a greater range of position and in particular, to allow the wings 18 to sweep further outward and downward. The main body 12 also includes a tapered front section 22 that is shaped to better receive the top cap 14. The main body 12 includes a shelf 24 that acts as a stop that fits into a pocket 26 on the top cap 14. This provides for a secure, repeatable, and precise placement of the top cap 14 on the main body 12. The nose of the main body is also tapered so that, along with the shelf 24, the top cap 14 and main body 12 fit in mated alignment.

The main body 12 also includes downward depending ridges 28 located on the bottom rear portion of the main body 12. The ridges 28 form a saddleback into which the bracket 16 sits. The saddleback design provides for repeatable attachment of the main body 12 to the bracket 16, and better resists rotational, twisting, and side-to-side stresses between the main body 12 and the bracket 16 when the ripper 10 is in use, which substantially reduces failure of the device. Additionally, the saddleback design allows for consistent repeatable placement of the ripper 10 on equipment by creating a uniform pocket for the bracket 16. This allows precise control of the elevation of the ripper 10 in operation on equipment.

The top cap 14 includes a tapered and rounded nose 30 that forms the impact surface of the device. This is the portion of the device that first impacts the ground, and as such undergoes the principal share of the wear. This surface is therefore typically hardened with a wear coating such as tungsten carbide to reduce wear.

The top cap 14 has rounded V-shaped profile, which creates less resistance during operation, requires less horsepower to fracture the soil, and creates a better wear angle. The rounded V-shape creates a sharper longer leading edge for better soil penetration. The effect is that the edge will stay sucked into the ground and stay there. The shorter and rounder nose of prior art devices tends to bounce out of the soil, rather than penetrate.

Unlike conventional prior art device, the present device utilizes wear coating on the back or underside of the impact surface 32. Placing the wear coating on the back, non-impact, edge of the wear part produces surprising advantages. The presence of the wear coating on the backside supports the impact front side surface from wear and better prevents wear than coating the front side. This is counter intuitive, and the prior art teaches away from such an approach. The prior art teaches putting the wear coating on the impact surface, or merely applies wear coating haphazardly to the entire part or working edge of the part without any distinction between the impact edge and the non-impact edge.

Additionally, in those situations where the sharpness of the face matters, coating the backside preserves a sharp cutting face. Coating the front side with a substance such as tungsten carbide defeats this advantage due to the fact that carbide coatings dull the face and interferes with the flow of edge through the surface it is applied to. Still further, the wear coating lasts longer on the non-impact surface since it is not in the path of abrasion as it would be with front side coating. Also, coating the backside reduces the amount of wear coating that needs to be applied in those cases where coating is applied to both sides of a wear part. These advantages are not realized if the coating is applied to the impact surface of applied generally to all surfaces.

The use of the wear coating on the backside, and as otherwise described herein, produces a lower draft as the flow of soil is not being interfered with to the extent as devices that use wear coating on the top surface. This also allows the ripper 10 to be operated at a higher speed without damage.

Wear coating is also, preferably, applied to the main body 12 at the inflection point 34 (see drawings FIGS. 1 and 4). When the ripper 10 is assembled the inflection point creates a recessed pocket behind the forward edge of the top cap 14. When the recessed pocket is filled with wear coating it becomes the lowest most exposed point of the ripper. As the lower edge of the top cap 14 wears, the wear coated inflection point 34 becomes both an impact surface and a wear surface. When wear coating is applied in this manner it provides an efficient and cost effective means of increasing the wear life of the ripper.

The bracket 16 is the point of attachment between the ripper 10 and the equipment that it is utilized with. The bracket 16 is generally U-shaped, and is attached to the underside of the main body 12 between the saddleback ridges 28 for a maximum secure fit therebetween. The bracket 16 includes holes in the sides for use to secure the bracket 16 to the equipment. The bracket 16 also includes a plate 17 attached to the bracket 16 to protect the head and nut of fasteners used to connect to the ripper 10 to equipment. The fasteners can experience residual impact from soil, debris, or stones during operation that might cause the fasteners to wear, break or come lose. The plate 17 protects against this occurrence. The bracket 16 is also shown in FIG. 6, without the plate 17.

The ripper 10 includes a wing 18. As can be seen in FIG. 1, the wing 18 sits between the curved portion rear portion 20 of the main body 12, and the top cap 14. The wing 18 extends on either side of the ripper 14 and is used to create a furrow in the soil below the surface. The width of the wing 18 will vary depending on the application. Typical widths for the wing 18 are 5", 7", and 10". Longer width displaces more soil, vary the turbulence and distribution of soil, and break up clods. In some circumstances, a wing is not needed, and a blank would be inserted to fill the gap between the top cap 14 and the main body 12. Wear coating can be placed on the bottom side of the edge of the wing 18 to protect the part from wear in the same manner as described above. The coating on the bottom, as mentioned, protects the wing 18 but does not interrupt the flow of material over the top of the part and allows for use with little resistance.

The wing 18 may also include a vertical fin (pointing down or up) that can be attached to each end of the wing, this would aid in breaking up clogs of dirt.

The main body 12 is preferably made of hardened alloy steel, the top cap 14 is preferably made from a high wear resistant casting, and the bracket 18 is preferably made from mild steel. The wings 18 are preferably made from hardened alloy plate. Other materials can be substituted depending on the circumstances.

FIGS. 8-11 disclose an additional embodiment of the present invention. The ripper 10 further comprises replaceable wings 18. The top cap 14 is shortened and a removable cap 36 sits behind the top cap 14. The cap 36 includes two holes for bolts 38 that can be releasable secured with nuts 40. The bolts 38 travel through aligned holes in the cap 36, wings 18, and main body 12. Additionally, the main body 12 includes nut pockets 42 that are shaped to receive the nuts 40 and prevent them from moving in the pocket 42. This makes it easier to thread the bolts 38 into the nuts 40, and protects the nuts 40 during operation from impact that might cause them to loosen or shear off.

Figure 12:
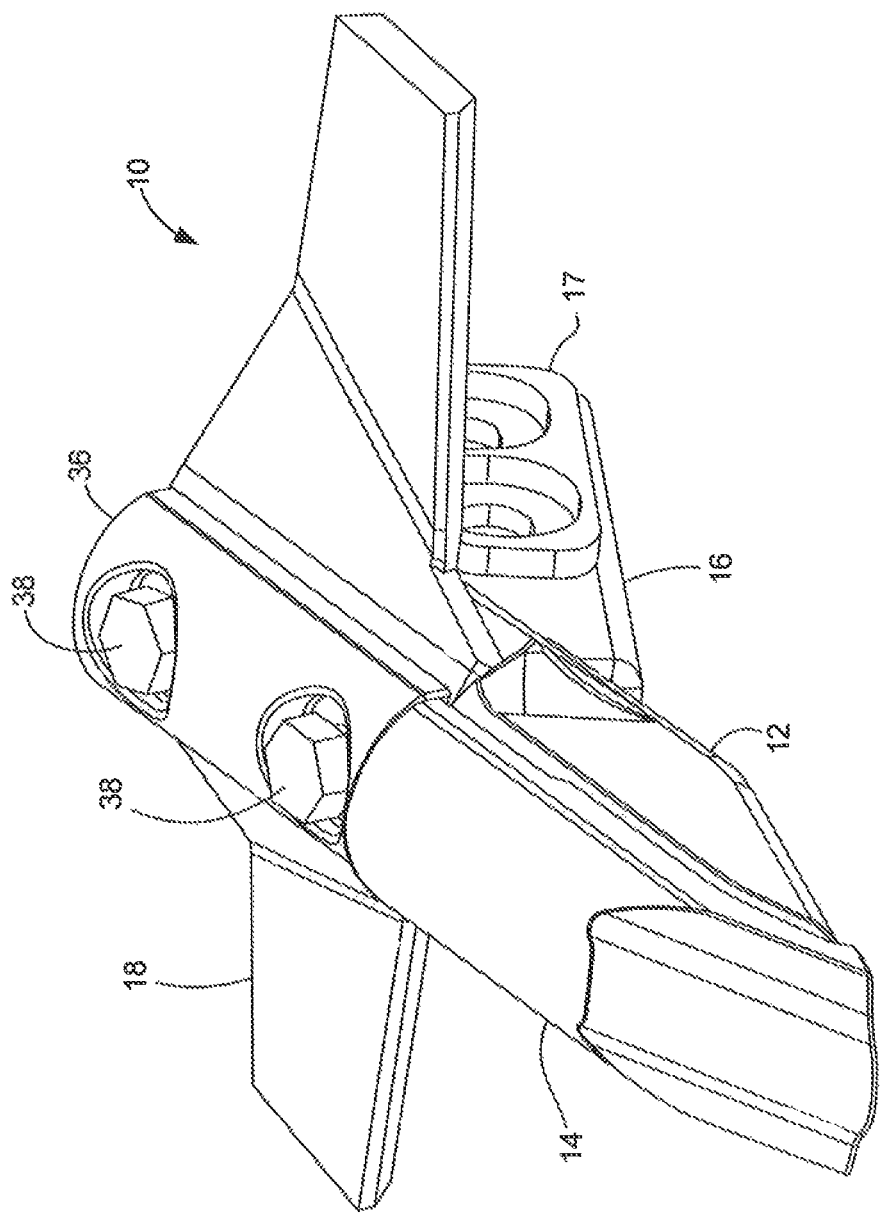
FIG. 12 shows a perspective view of a ripper with replaceable wings.
Figure 13:
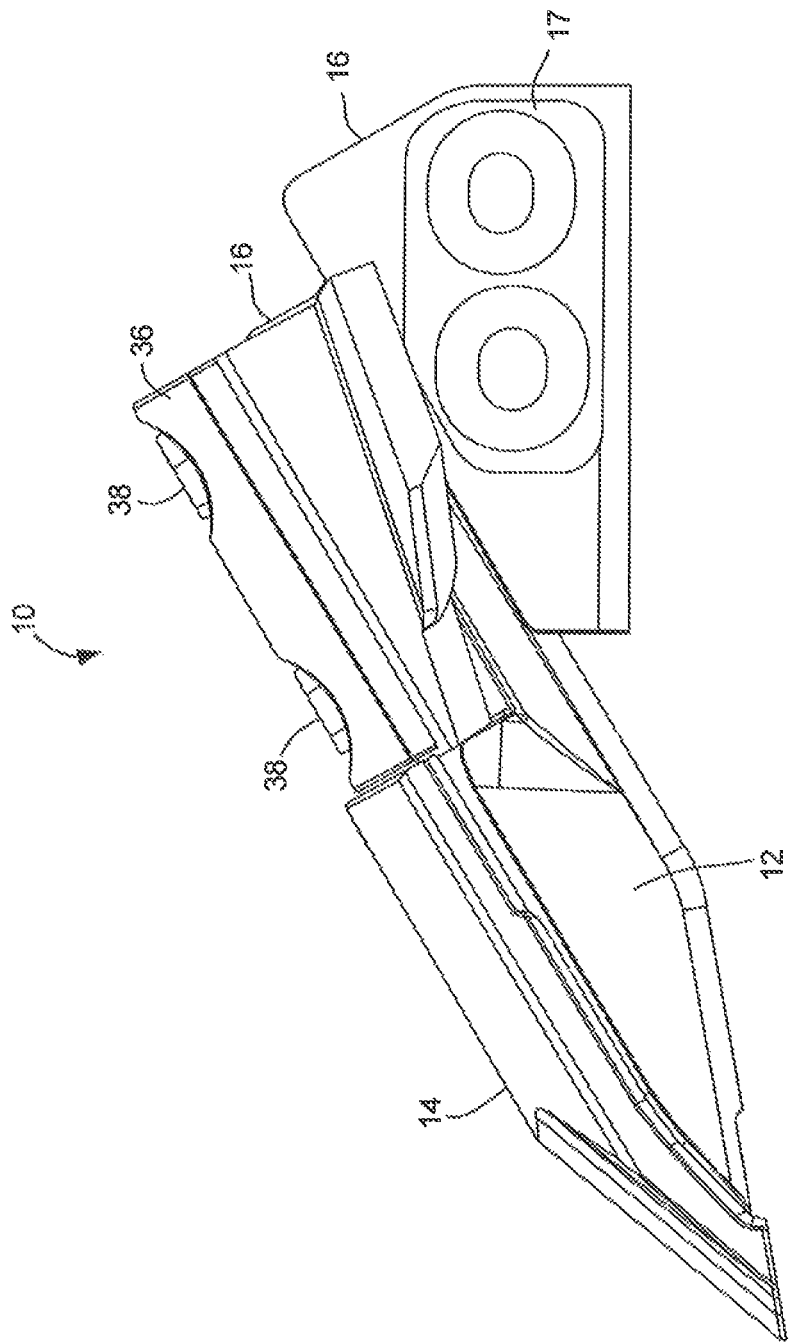
FIG. 13 shows a side view of the ripper of FIG. 12.

FIGS. 12-13 show yet another embodiment of a ripper 10 with replaceable wings. In this embodiment the wings 18 are not sloped/curved as described previously, but are instead flat which results in lifting of the upper surface of the soil located above the wings, as opposed to fracturing of the upper layer of soil. This result may be desirable in certain conditions. The wings 18 of the present invention, whether replaceable or not, can come in a variety of sizes. For the curved wing each wing can be 7" or 10" in length. For the flat wing each wing can be 8", 10", or 12" in length. Also, there can be no wing in which case the wings 18 can be replaced with a 2" slug between the cap 36 and the main body 12. Other sizes and shapes are possible without departing from the scope of the present invention.

Figure 14:
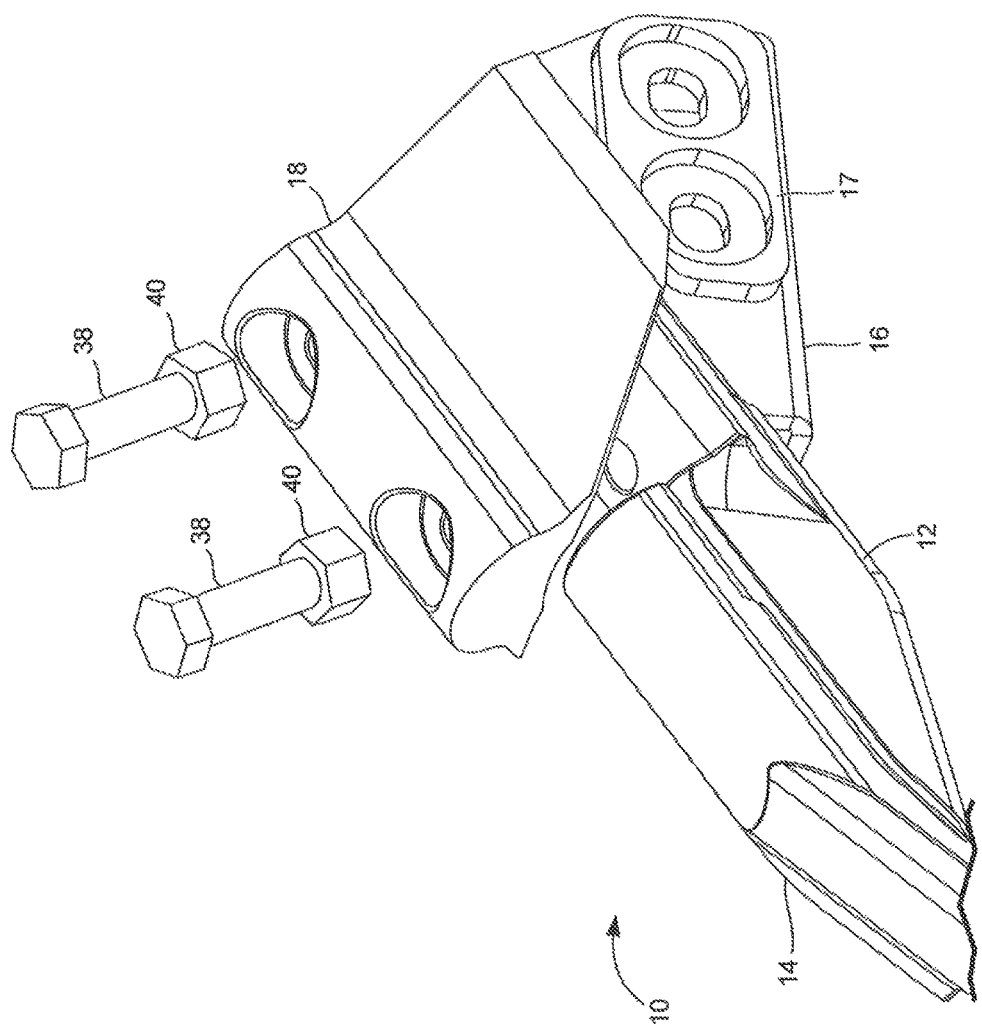
FIG. 14 shows a perspective view of a ripper with replaceable wings.
Figure 15:
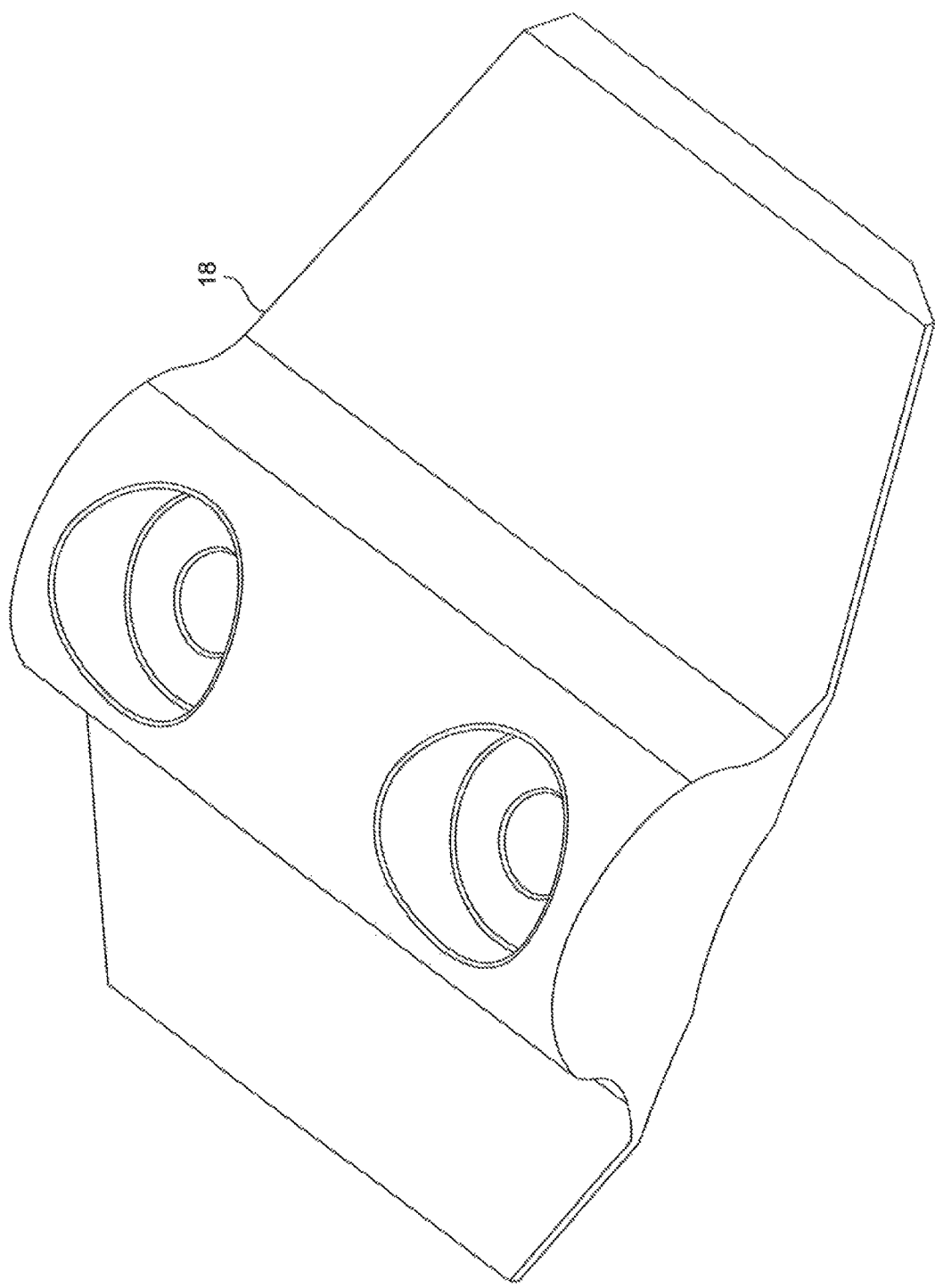
FIG. 15 shows a perspective view of the wing of FIG. 14.

FIGS. 14-15 show yet another embodiment of the ripper 10. In this embodiment, the wing 18 is a single piece, wherein the wing 18 is attached directly to the main body 12 with nuts and bolts 38, 40. The wing 18 includes recessed pockets to receive and protect the heads of the bolts 38.

Preferably, the wing of the present invention shown in FIGS. 14, 15 is either forging or a Carbidic Austempered Ductile Iron (CADI) casting, which provides for greater strength and provides more flexibility to design the wing to meet special needs. The thickness of the wing is varied to enhance the flow of soil over and around the wings, which increases the effectiveness of the device and reduce the amount of power need to penetrate soils. For example, the thickness can be increased around the leading and trailing edges of the wing for this purpose.

Furthermore, the design now only allows for adjusting the wing to meet changing demands in the field, but in a manner that does not require removing the entire ripper from itself. The ripper can be left in place and the adjustment can still be made, providing even greater flexibility.

Still further, the advantage of the replaceable wing is that the wing size and shape can be varied at the time of use based on soil and weather conditions to suit individual needs, merely by selecting the desired wing. This allows the user to match the wing with the desired outcome at the time of use, taking into consideration the precise soil conditions. This greatly increases the effectiveness of ripping over having to use a ripper that cannot be replaced or adjusted.

These and other advantages will be apparent to those of ordinary skill in the art.

While the various embodiments of the invention have been described in reference to the Figures, the invention is not so limited. Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods, and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention. Those of ordinary skill in the art that have the disclosure before them will be able to make modifications and variations therein without departing from the scope of the invention.

The invention claimed is:

1. A deep ripper with replaceable wings for fracturing soil below the surface of the ground and securable to a shank of an implement, comprising:
   a main body;
   a top cap located above the main body having an impact edge that overhangs the front of the main body;
   replaceable wings mounted to the main body where the wings extend outward from both sides of the main body;
   the main body securable to the shank of the implement; and
   wherein a center portion of the wings and top cap are in the same plane.

2. The ripper of claim 1 further comprising at least two sets of replacable wings having varying shapes to adapt to different conditions of use that can be interchangeably secured to the main body.

3. The ripper of claim 1 where the wings have at least one hole through which at least one bolt passes through to secure the wings to the main body.

4. The ripper of claim 1 further comprising a removable cap on top of the wings that has at least one hole through which at least one bolt passes through to secure the wings to the main body.

5. The ripper of claim 3 where the wings have two holes through which bolts pass through, and the main body has aligned holes such that the bolts secure the wings to the main body.

6. The ripper of claim 5 further comprising nuts that thread onto the bolts.

7. The ripper of claim 6 where the main body further comprises nut pockets shaped to receive the nuts and prevent them from moving and to protect the nuts from impact during operation of the ripper.

8. The ripper of claim 1 further comprising two opposing shoulder sections on the underside of the main body having a recessed section therebetween forming a saddleback on the bottom of the main body.

9. The ripper of claim 8 further comprising a bracket secured between the two opposing shoulder sections of the main body.

10. The ripper of claim 1 where the wings have a recessed hole through which a bolt passes through to secure the wings to the main body.

11. The ripper of claim 10 where the wings have two recessed pockets and two holes through which bolts pass through, and the main body has aligned holes such that the bolts secure the wings to the main body.

12. The ripper of claim 1 further comprising four sets of replacable wings where one set of wings slope downward relative to the main body, where another set of wings extend outward from the main body without deflection, where another set of wings vary in length and thickness, and where another set of wings have an edge that slopes backward relative to the main body.

13. The ripper of claim 1 where the top cap and a center portion of the wings are curved in arcs that are substantially concentric.

14. The ripper of claim 1 where the wings are flat.

15. The ripper of claim 1 where the main body has a shelf and a recessed front section to form a point of securement with a ridge on the bottom of the top cap that contacts the shelf.

16. The ripper of claim 1 where the overhang of the top cap over the main body creates a recessed pocket behind the impact edge of the top cap.

17. The ripper of claim 1 where the top cap has an elongated rounded protrusion on a top front that terminates at the impact edge.

18. The ripper of claim 16 where the recessed pocket is covered with wear coating.

19. The ripper of claim 1 where only the bottom of the impact edge is covered with a wear coating.

20. The ripper of claim 1 where the main body has a recessed pocket behind a forward edge of the top cap.

21. The ripper of claim 1 where the wings have variable thicknesses.

22. The ripper of claim 1 where the wings have a beveled leading edge.

23. The ripper of claim 1 where the impact edge is at a lower elevation than forward edges of the wings.

24. The ripper of claim 1 where the wings are made from a single piece forged construction.

25. The ripper of claim 1 where wear coating is placed only on the underside of a leading edge of the wings.

26. The ripper of claim 25 where wear coating is placed only on the bottom of a wear surface behind the impact edge.

27. A deep ripper with replaceable wings for fracturing the soil below the surface of the ground, comprising:
- a main body having a saddle back cavity comprising two opposing shoulder sections with a recessed section therebetween on the bottom of the main body, and where the main body has a recessed pocket at the bottom front covered with a wear coating;
- a bracket having holes adapted to allow the ripper to be releasably secured to other equipment, the bracket secured between the two opposing shoulder sections of the main body, the bracket also comprising a plate adapted to protect fasteners used to connect the ripper to equipment;
- a top cap secured to the top of the main body having an impact edge and where the main body has a shelf and a recessed front section to form a point of securement with a ridge on the bottom of the top cap that contacts the shelf, and the top cap has an elongated rounded protrusion on the top front that terminates at the impact edge, and where a forward edge of the top cap creates a recessed pocket in the main body;
- a replaceable wing secured with nuts and bolts to the main body where the top of the main body is curved along a transverse axis at the point of attachment to the wing, and the wing is correspondingly curved;
- where the recessed pocket of the main body and only the bottom of the impact edge of the top cap are covered with a wear coating; and
- wherein a center portion of the wings and top cap are in substantially the same plane.

28. A deep ripper with replaceable wings for fracturing the soil below the surface of the ground, comprising:
- a main body having a saddle back cavity comprising two opposing shoulder sections with a recessed section therebetween on the bottom of the main body, and where the main body has a recessed pocket at the bottom front covered with a wear coating;
- a bracket having holes adapted to allow the ripper to be releasably secured to other equipment, the bracket secured between the two opposing shoulder sections of the main body, the bracket also comprising a plate adapted to protect fasteners used to connect the ripper to equipment;
- replaceable wings having two recessed pockets and two holes through which bolts pass through, and the main body has aligned holes such that the bolts secure the wings to the main body, and the main body where the top of the main body is curved along a transverse axis at the point of attachment to the wing;
- where only the underside of an impact surface that fractures the soil is covered with a wear coating; and
- wherein a center portion of the wings and top cap are in substantially the same plane.

* * * * *